No. 772,955. PATENTED OCT. 25, 1904.
A. M. I. McLEOD.
RUBBER FOR SURFACING STONE, MARBLE, &c.
APPLICATION FILED JULY 5, 1900.
NO MODEL.
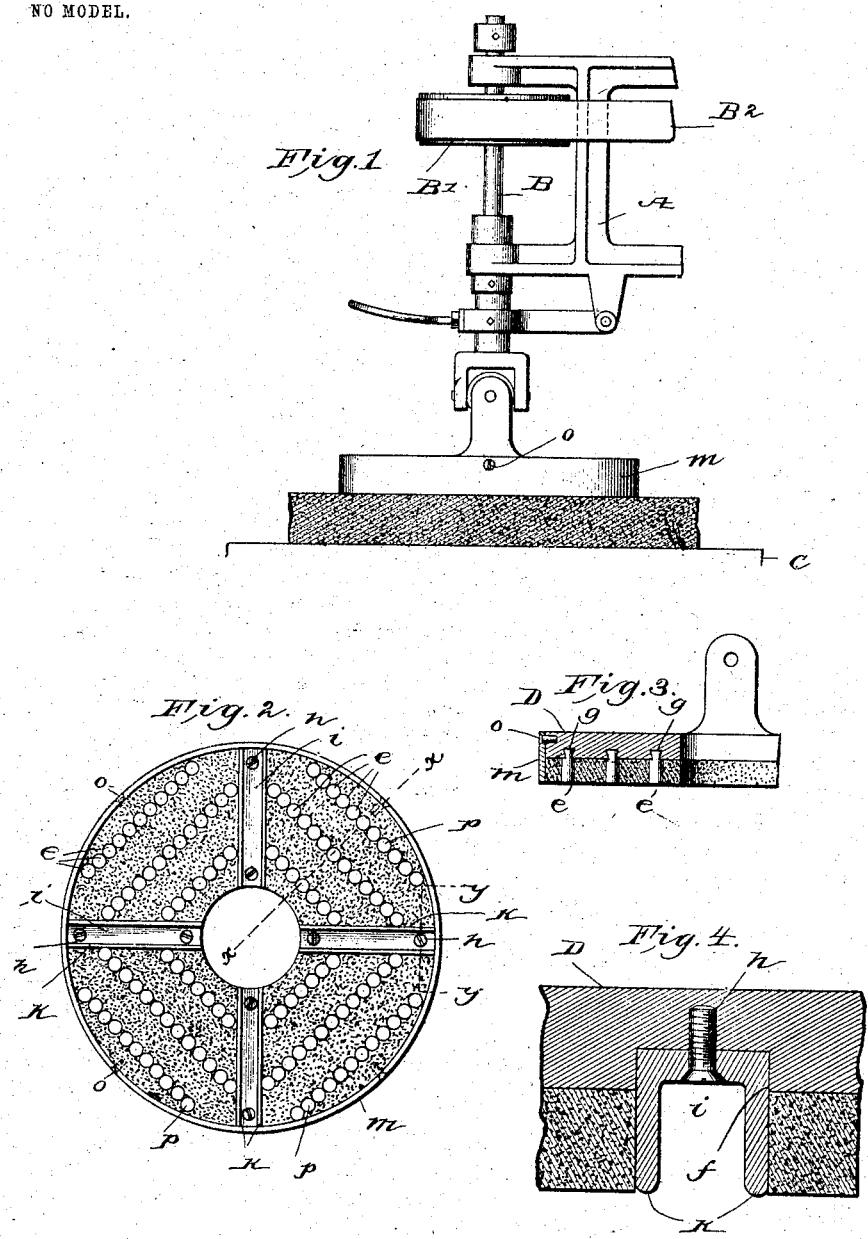
Witnesses.
W. C. Lunsford.
Fred S. Greenhof.
Inventor.
Alexander M. I. McLeod.
by Crosby Gregory.
Atty's.

No. 772,955. Patented October 25, 1904.

UNITED STATES PATENT OFFICE.

ALEXANDER M. I. McLEOD, OF QUINCY, MASSACHUSETTS.

RUBBER FOR SURFACING STONE, MARBLE, &c.

SPECIFICATION forming part of Letters Patent No. 772,955, dated October 25, 1904.

Application filed July 5, 1900. Serial No. 22,545. (No model.)

*To all whom it may concern:*

Be it known that I, ALEXANDER M. I. MCLEOD, a citizen of the United States, and a resident of Quincy, county of Norfolk, State of Massachusetts, have invented an Improvement in Rubbers for Surfacing Stone, Marble, &c., of which the following description, in connection with the accompanying drawings, is a specification, like letters on the drawings representing like parts.

This invention relates to devices for smoothing or dressing stone, marble, &c., and is an improvement on the device illustrated in United States Patent No. 642,355, granted to me on January 30, 1900.

In the patent above referred to the rubber was provided with a series of blades which were detachably supported on the stiff-metal backing-plate, the said blades being suitably braced at their ends.

In my present improvement instead of using blades for rubbing surfaces I provide the back plate with suitably-arranged pins, preferably of soft steel.

In the drawings, Figure 1 shows in elevation a sufficient portion of an apparatus for moving a rubber with my improved rubber applied thereto to enable my invention to be understood. Fig. 2 is an enlarged under side view of the rubber. Fig. 3 is a section taken on the line $x\ x$, Fig. 2; and Fig. 4 is a section taken on the line $y\ y$, Fig. 2.

The head A, carrying the spindle B and driving-pulley B', the encircling belt B², and the bed or support C are and may be all as usual in such machines and as shown in my aforesaid patent.

The invention herein disclosed resides chiefly in the rubber itself, and this comprises a back plate D, to which are attached a plurality of rubbing members in the form of pins $e$, suitably arranged and between which is held a suitable material softer than the pins. The pins or rubbing members are preferably arranged in rows, and each row will contain a plurality of the rubbing members, with the result that the operative face of the rubber comprises a series of rows of rubbing surfaces, each row comprising a plurality of independent rubbing surfaces.

The pins forming the rubbing members are preferably detachably secured to the back plate D, and to provide suitable means for thus holding them in place I construct the said back plate D as follows: On the under side of said plate D, I provide suitable radially-arranged channels $f$, preferably four in number and arranged approximately ninety degrees apart, as shown in Fig. 2. This specific arrangement is only preferable, however, and I may provide a greater or less number of channels without departing from the spirit of my invention. Further, these channels may have some other than radial arrangement, if desired. Leading from the channels $f$ are a series of grooves $g$, which in this instance pass from one channel to the next adjacent channel, and these grooves are made of some irregular shape, preferably dovetailed, in order to afford securing means for the pins $e$, as will be presently described. In the manufacture of my improved rubber these grooves will preferably be cut in the face of the back plate by means of a planer or shaper, and therefore it is desirable that the channels $f$ be made deep enough to accommodate the tool used in cutting the grooves. The preferable arrangement of the grooves $g$ is shown in Fig. 2; but I wish it understood that this precise arrangement is not important, as it is obvious that other ways of arranging the grooves may be used, it only being essential that the grooves terminate in the channels $f$.

The pins $e$, which in this invention take the place of the usual blades or other rubbing surfaces in other rubbers, are each provided with heads or ends of the proper shape to fit the grooves $g$, and in the embodiment of the invention illustrated in the drawings these ends are dovetailed to fit the dovetailed grooves.

It will be obvious that the grooves may be of other shapes, in which case the pin ends would of course be of the appropriate shape to fit the grooves. In making these pins I cut suitable lengths from a metal rod and then place a number of the pins in a shaper or other appropriate machine and plane the ends to the proper shape to fit the grooves. By this means the ends of all the pins are of uniform size and can be nicely fitted to the grooves.

In assembling the parts of the rubber I insert from one end a series of pins in each groove—that is, the pins are slipped into the groove laterally—and place the pins close together, as shown in Fig. 2. I then secure in each channel by suitable means, as screws *h*, a channeled bar *i*, having the side flanges *k*, as shown in Fig. 4. The side flanges of these bars serve to retain the pins in the grooves, and the channels between said side flanges furnish a ready means for the escape of material as it is worn away. The pins and also the channel-bars *i* are preferably made of material softer than cast-iron—such, for instance, as wrought-iron or soft steel—and the space between the rows of pins and channel-bars *i* is or may be filled with some substance which wears away somewhat faster than the soft-metal pins, such as cement or plaster-of-paris. A suitable hoop or band *m* is placed around the entire structure, as shown in Fig. 2, said hoop or band being secured to the back plate D by any suitable means, such as screws *o*. This hoop serves not only as an outside support for the filling material, but also as a retaining means for the outside rows *p* of pins.

From the foregoing it will be seen that I have provided a rubber wherein the rows of pins, which correspond to the blades in an ordinary rubber, are detachably held to the back plate without the use of bolts or screws.

Whenever the face of the rubber becomes too worn for further use it is not necessary to throw away the entire rubber, as by removing the channel-bars *i* the old pins can be taken out and their place supplied with fresh pins, it being understood that in such an event new filling material would have to be supplied.

My invention is capable of various changes, all within the scope of the appended claims.

Having described my invention, what I claim, and desire to secure by Letters Patent, is—

1. In a rubber, a back plate, having a series of grooves in the face thereof, and suitable rubbing members retained at one end in said grooves.

2. In a rubber, a back plate having a series of dovetailed grooves in the face thereof, and suitable rubbing members fitted to and retained in said grooves.

3. In a rubber a back plate having a series of grooves and a series of pins retained in said grooves.

4. In a rubber, a back plate having a series of grooves and a series of individually-removable pins retained against longitudinal movement in said grooves.

5. In a rubber, a back plate having a series of radially-arranged channels, grooves connecting said channels, rubbing members supported in said grooves, and means in the channels for retaining the rubbing members in the grooves.

6. In a rubber, a back plate having in the face thereof a series of channels, grooves connecting said channels, a series of separate pins sustained in said grooves and forming separate rubbing surfaces, and channel-bars secured in said channels, the flanges of said bars serving to retain the pins in the grooves.

7. A rubber having a rubbing face composed of a series of metal pins, the spaces between the pins being filled with a substance which will wear away a little faster than the said pins, the said face being provided with radially-arranged open channels.

8. A rubber having its rubbing face composed of a series of pins said rubber having radially-arranged open channels on its face.

In testimony whereof I have signed my name to this specification in the presence of two subscribing witnesses.

ALEXANDER M. I. McLEOD.

Witnesses:
GEO. W. GREGORY,
MARGARET A. DUNN.